(12) United States Patent
Hirama

(10) Patent No.: US 8,094,329 B2
(45) Date of Patent: Jan. 10, 2012

(54) IMAGE PROCESSING APPARATUS AND METHOD FOR PROCESSING AN IMAGE WITH SECURE JOB INTERRUPTION

(75) Inventor: Kenichi Hirama, Tokyo (JP)

(73) Assignee: Oki Data Corporation, Tokyo (JP)

( * ) Notice: Subject to any disclaimer, the term of this patent is extended or adjusted under 35 U.S.C. 154(b) by 769 days.

(21) Appl. No.: 12/155,637

(22) Filed: Jun. 6, 2008

(65) Prior Publication Data

US 2008/0304104 A1 Dec. 11, 2008

(30) Foreign Application Priority Data

Jun. 8, 2007 (JP) ................................. 2007-152419

(51) Int. Cl.
*G06K 15/00* (2006.01)
(52) U.S. Cl. .......................... 358/1.14; 358/1.15; 726/28
(58) Field of Classification Search .................. None
See application file for complete search history.

(56) References Cited

U.S. PATENT DOCUMENTS

| | | | |
|---|---|---|---|
| 6,986,136 B2* | 1/2006 | Simpson et al. | 718/102 |
| 7,684,064 B2* | 3/2010 | Kimura et al. | 358/1.14 |
| 2005/0100378 A1* | 5/2005 | Kimura et al. | 400/76 |
| 2005/0179933 A1* | 8/2005 | Akao | 358/1.14 |
| 2005/0200885 A1* | 9/2005 | Nishizawa et al. | 358/1.15 |
| 2005/0210253 A1* | 9/2005 | Shigeeda | 713/171 |
| 2006/0077456 A1* | 4/2006 | Aoki | 358/1.15 |
| 2006/0087424 A1* | 4/2006 | Koike | 340/539.1 |
| 2006/0218391 A1* | 9/2006 | Glazer et al. | 713/152 |
| 2006/0274353 A1* | 12/2006 | Nemoto | 358/1.14 |
| 2007/0127053 A1* | 6/2007 | Tominaga | 358/1.15 |
| 2010/0134822 A1* | 6/2010 | Kimura et al. | 358/1.15 |

FOREIGN PATENT DOCUMENTS

| | | |
|---|---|---|
| JP | 05-199341 | 8/1993 |
| JP | 2004-086766 A | 3/2004 |
| JP | 2004-171044 A | 6/2004 |
| JP | 2007-137002 A | 6/2007 |

* cited by examiner

*Primary Examiner* — Twyler Haskins
*Assistant Examiner* — Nicholas Pachol
(74) *Attorney, Agent, or Firm* — Rabin & Berdo, P.C.

(57) ABSTRACT

An image processing apparatus performs authentication of users. A first and second user inputs first and second user information, respectively, through an input section. A controller controls the authentication section to perform first authentication of the first user information, and controls the job execution section to execute the first job if the first authentication is successful. The controller controls the job execution section to halt execution of the first job upon an interrupt by the second user, and to execute the second job when the first job remains interrupted. A memory stores interrupt information indicative of a status of execution of the first job when the interrupt occurs. The controller controls the authentication section to perform second authentication of the first user information after the second job has been completed, and then controls the job execution section to resume execution of the first job if the second authentication is successful.

12 Claims, 10 Drawing Sheets

| JOB ID | J0001 |
|---|---|
| USER ID | U0001 |
| FUNCTION ID #01 | F01 |
| FUNCTION ID #02 | F02 |
| FUNCTION ID #03 | NONE |
| FUNCTION ID #04 | NONE |

| FUNCTION ID | FUNCTION | PAGES | STATUS |
|---|---|---|---|
| F01 | SCAN | 20 | COMPLETED |
| F02 | PRINT | 15 | IN PROGRESS |

| USER ID | U0001 | U0002 | U0003 |
|---|---|---|---|
| PASSWORD | P0001 | P0001 | P0003 |
| NAME | USER1 | USER2 | USER3 |
| EMAIL | USER1@XXX | USER2@XXX | USER3@XXX |
| FAX | 0001 | 0002 | 0003 |

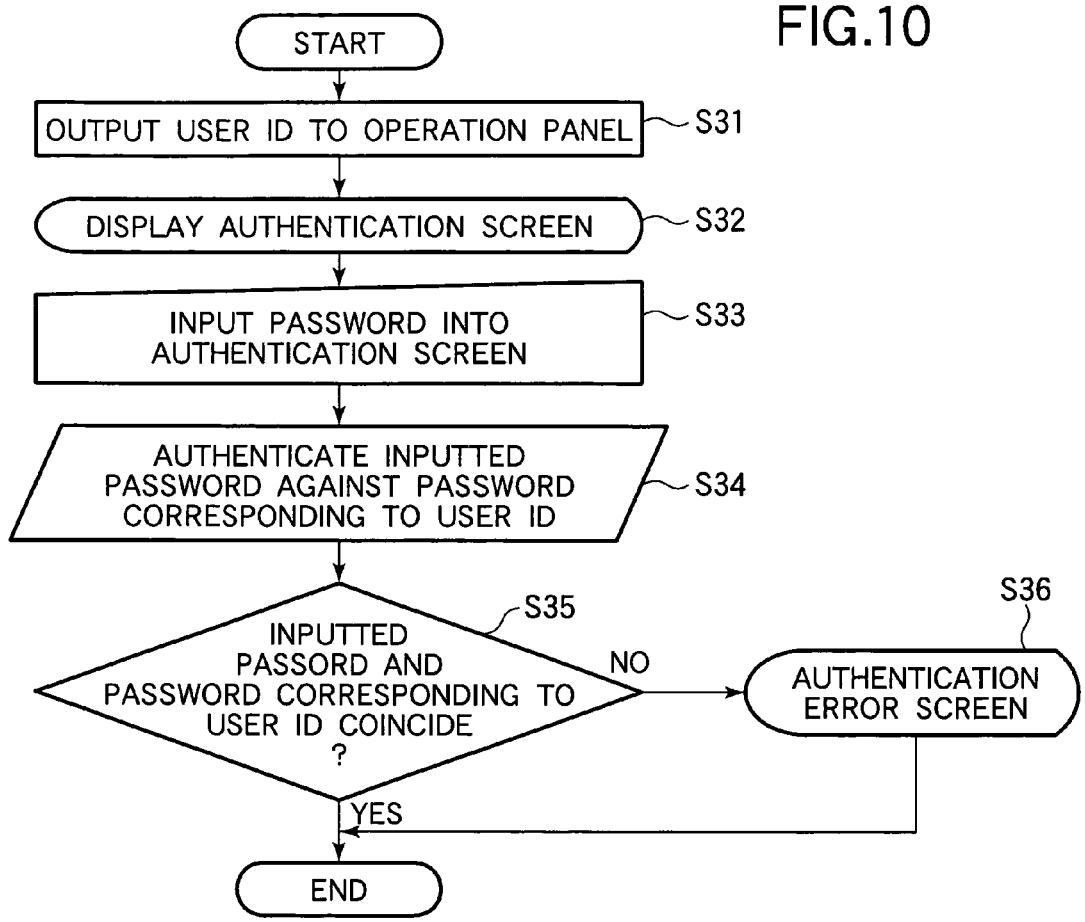

| FUNCTION ID | FUNCTION | IN QUEUE | IN PROGRESS | COMPLETED |
|---|---|---|---|---|
| F01 | SCAN | YES | YES | NO |
| F02 | PRINT | NO | NO | NO |

"YES" INDICATES THAT RE-AUTHENTICATION IS REQUIRED
"NO" INDICATES THAT RE-AUTHENTICATION IS NOT REQUIRED

IMAGE PROCESSING APPARATUS AND METHOD FOR PROCESSING AN IMAGE WITH SECURE JOB INTERRUPTION

BACKGROUND OF THE INVENTION

1. Field of the Invention

The present invention relates to an image processing apparatus, and a method for processing an image.

2. Description of the Related Art

A conventional image processing apparatus is capable of handling a job interrupt. For example, when a copying operation is being executed, no other job may be processed concurrently. A user may interrupt a job currently in progress, requesting his special job to be processed ahead of the job currently in progress. Upon completion of the execution of the special job, the execution of the interrupted job may be resumed.

Such a conventional image processing apparatus does not usually provide security for the interrupted job. In other words, when the interrupted job is resumed, the processing of the interrupted job is not protected from intentional penetration by unauthorized users.

SUMMARY OF THE INVENTION

The present invention was made in view of the drawbacks of conventional image processing apparatuses.

An object of the invention is to provide security for an interrupted job when the printing of the interrupted job is resumed.

An image processing apparatus performs authentication of the users. A first and second user inputs first and second user information through an inputting section. An authentication section performs authentication of the first user based on the first user information and authentication of the second user based on the second user information. A job execution section executes a first job and a second job. A controller controls the authentication section to perform first authentication of the first user information, and controls the job execution section to execute the first job if the first authentication is successful, to halt execution of the first job upon an interrupt inputted through the input section by a second user, and controls the job execution section to execute the second job when the first job remains interrupted. The controller includes a memory that stores interrupt information indicative of a status of execution of the first job when the interrupt occurs. The controller controls the authentication section to perform second authentication of the first user information after the second job has been completed. The controller controls the job execution section to resume execution of the first job if the second authentication is successful.

The first user information includes a user ID and a password for the first user, and the authentication section performs the first authentication based on the user ID and the password for the first user. When the authentication section performs the second authentication, the authentication section displays the user ID on a display prompting the first user to input the password, and then performs the second authentication based only on the password inputted in response to the prompt.

A method of processing information includes the steps of:
executing first authentication of a first user based on first user information against a previously stored first user;
executing a first job if the first authentication is successful;
accepting an interrupt when the first job is being executed;
halting execution of the first job in response to the interrupt and then storing interrupt information indicative of a status of execution of the first job;
executing a second job when the first job remains interrupted;
executing second authentication of the first user after the second job has been completed, the second authentication being performed based on the first user information; and
resuming execution of the first job if the second authentication is successful.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 6A illustrates a job identifying table that lists job information;

FIG. 6B illustrates an execution status table that lists interrupt information on a job currently in progress when an interrupt occurs;

FIG. 7 illustrates a user management table;

FIG. 10 is a flowchart illustrating re-authentication;

FIG. 11 illustrates an authentication screen when the re-authentication is performed;

DETAILED DESCRIPTION OF THE INVENTION

First Embodiment

{Overall Configuration}

Figure 1:
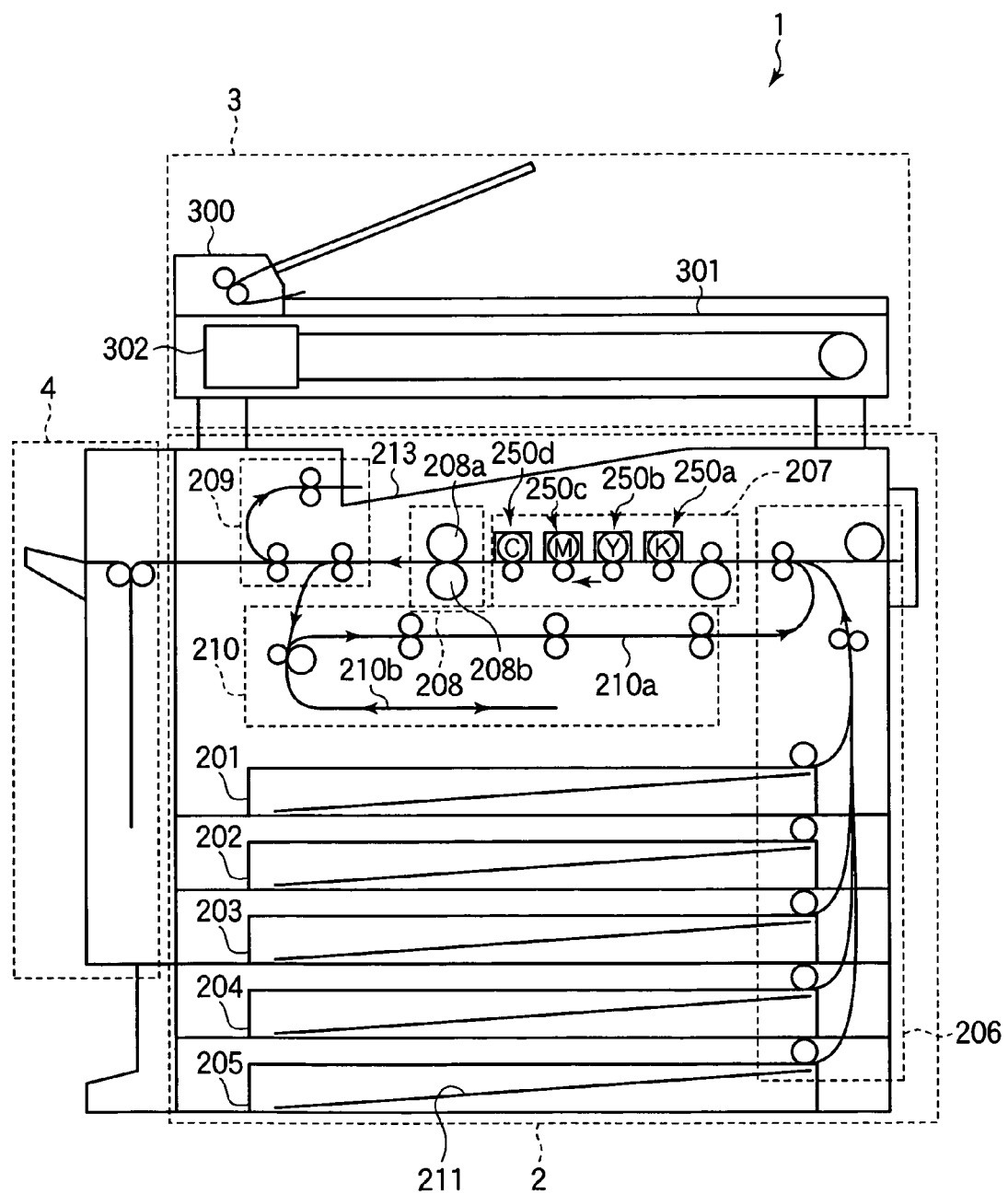
FIG. 1 illustrates a general configuration of an image processing apparatus.

FIG. 1 illustrates a general configuration of an image processing apparatus 1 of a first embodiment.

The image processing apparatus 1 takes the form of a digital multi-function apparatus including a printer 2, a scanner 3, and a finisher 4. The printer 2 includes paper cassettes 201-205, a paper feeding section 206, an image forming section 207, a fixing section 208, a discharging section 209, and a paper inverter 210 for duplex printing. The paper cassettes 201-205 hold stacks of print medium 211 such as print paper of different sizes, respectively. A top page of the stack of print medium 211 is fed into the paper feeding section 206 at a predetermined timing during printing. The paper feeding section 206 advances the print medium 211 to the image forming section 207. The printer 2 receives a print job from a host apparatus, and then prints the image information contained in the print job on the print medium 211. The print medium 211 is advanced in a transport path in directions shown by arrows.

The image forming section 207 includes image forming units 250a-250d that form black (K), yellow (Y), magenta (M), and cyan (C) images, respectively. The image forming units 250a-250d are aligned in this order from upstream to downstream with respect to travel of the print medium 211 along the transport path. The image forming units 250a-250d are light-emitting diode (LED) type digital color print engines of the same configuration, and differ only in the color of formed images. The image forming units 250a-250d are driven to operate by corresponding drive motors (not shown).

Figure 2:
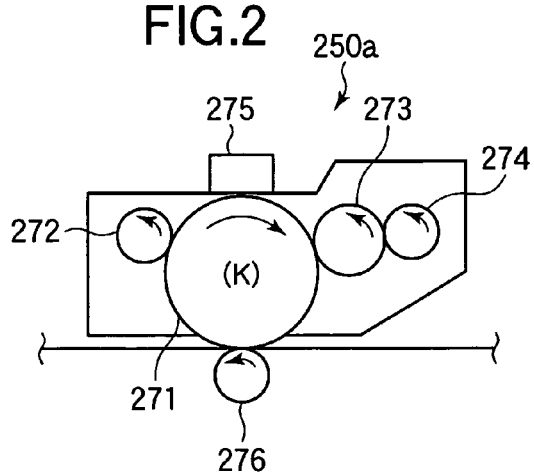
FIG. 2 is an expanded view illustrating an image forming unit and its vicinity.

Thus, for simplicity's sake, the image forming unit 250a for black images will be described by way of example. FIG. 2 is an expanded view illustrating the image forming unit 250a and its vicinity.

Referring to FIG. 2, the image forming unit 250a includes a photoconductive drum 271, a toner supplying roller 274, an LED head 275, and a transfer roller 276. The charging roller 272, LED head 275, developing roller 273, and transfer roller 276 are disposed around the photoconductive drum 271 from upstream to downstream with respect to rotation of the photoconductive drum 271. The charging roller 272 charges the surface of the photoconductive drum 271 uniformly. The LED head 275 illuminates the charged surface of the photoconductive drum 271 in accordance with image information to form an electrostatic latent image. The developing roller 273 supplies black toner to the electrostatic latent image to form a black toner image. The transfer roller 276 transfers the black toner image onto the print medium 211. The toner supplying roller 274 rotates in contact with the developing roller 273 to supply the black toner to the developing roller 273.

As the print medium 211 passes through the image forming units 250a-250d, black, yellow, magenta, and cyan toner images are transferred onto the print medium 211 one over the other in registration. Then, the print medium 211 advances into the fixing section 208 (FIG. 1). The fixing section 208 includes a heat roller 208a and a pressure roller 208b. As the print medium 211 passes through a fixing point defined between the heat roller 208a and pressure roller 208b, the toner images are fused by heat and pressure into a full color permanent image. Then, the print medium 211 leaves the fixing section 208, and is then discharged by the discharging section 209 onto a stacker 213.

The paper inverter 210 for duplex printing is located downstream of the fixing section 208. The paper inverter 210 pulls in the print medium 211 having a full color image printed on one side thereof until the print medium 211 has been fed into the inverter chute 210b. Then, the print medium 211 is transported in the opposite direction into a duplex path 210a, being fed back to the image forming section 207 with the aid of a medium router (not shown). In this manner, another full color toner image may be transferred onto a non-printed side of the print medium 211 for duplex printing.

The scanner 3 includes an automatic document feeder (ADF) 300, a copy glass 301, and a scanning head 302. The scanner 3 is capable of reading an image from an original such as a photograph, a document, or a drawing on paper or films, and of forming the image on a print medium. An operator places the original on the copy glass 301, and then the scanning head 302 optically scans the surface of the original to receive light reflected back from the original. The intensity of the received light is converted into image information by analog-digital conversion. The automatic document feeder 300 and copy glass 301 each include a sensor (not shown) for detecting whether an original has been placed in position on the copy glass 301.

The finisher 4 carries out a finishing operation including punching and stapling of the pages of print medium on which images are printed by the printer 2.

Figure 3:
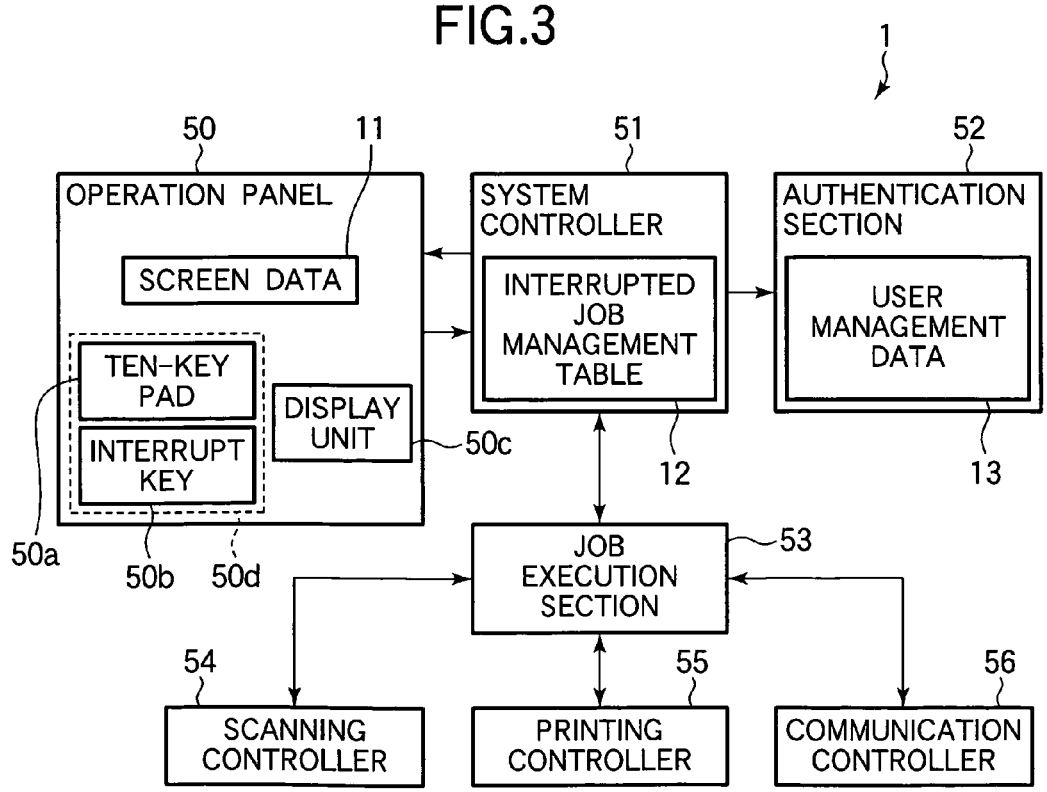
FIG. 3 is a block diagram illustrating a general configuration of a control system of the image processing apparatus.

FIG. 3 is a block diagram illustrating the general configuration of a control system that controls pertinent operations of the image processing apparatus 1. The control system includes an operation panel 50, a system controller 51, an authentication section 52, a job execution section 53, a scanning controller 54, a printing controller 55, and a communication controller 56.

The operation panel 50 includes an inputting device 50d, a screen data 11, and a display unit 50c. The inputting device 50d includes a ten-key pad 50a through which the operator inputs his authentication information, and an interrupt key 50b with which the user may generate an interrupt. The screen data 11 is a graphical user interface (GUI) that allows the operator to communicate with the image processing apparatus 1 by using the inputting device and the display unit 50c. The screen data 11 includes a plurality of items of screen data that indicate the status and settings of the image processing apparatus 1. The screen data includes an authentication screen 21 shown in FIG. 4 and an authentication error screen 22 shown in FIG. 5. The operator inputs authentication information through the authentication screen 21. The authentication error screen 22 indicates to the operator that authentication failed.

Figure 4:
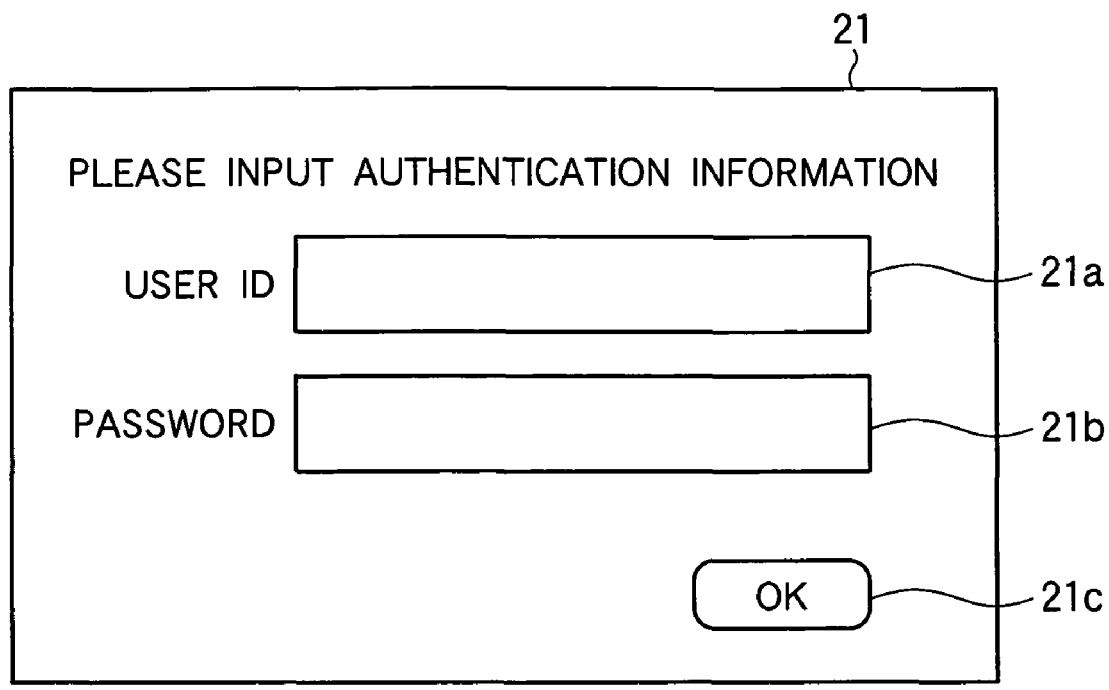
FIG. 4 illustrates an authentication screen when a user is authenticated.

FIG. 4 illustrates the authentication screen 21 when a user is authenticated.

Referring to FIG. 4, the authentication screen 21 includes a user ID box 21a, a password box 21b, and an OK button 21c. The user inputs his user ID, which identifies the user, into the user ID box 21a. Then, the user inputs his password through the password box 21b, and finally touches the OK button 21c, which is a software key displayed on a touch panel, to confirm that the user ID and password have been inputted.

Figure 5:
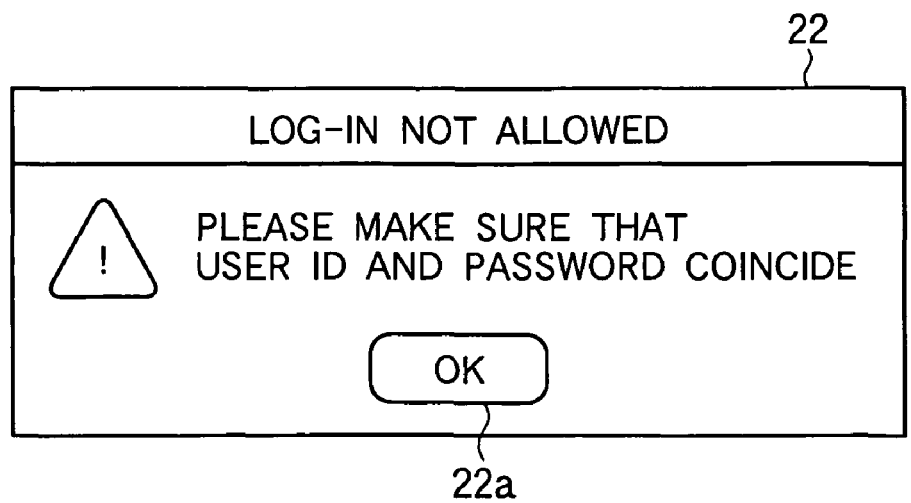
FIG. 5 illustrates an authentication error screen.

FIG. 5 illustrates the authentication error screen 22. The authentication error screen 22 includes an OK button 22a, which is also a software key. The user touches the OK button 22a to confirm the displayed information on the authentication error screen 22.

The system controller 51 performs the overall control of the image processing apparatus 1. The system controller 51 also handles an interrupt when a job is interrupted, and resumes the interrupted job upon completion of the processing of an interrupt job. The system controller 51 includes a memory device (e.g., RAM) that stores an interrupted job management table 12. The interrupted job management table 12 includes a job identifying table 12a and an execution status table 12b.

FIG. 6A illustrates the job identifying table 12a that lists job identifying information. The job identifying table 12a stores a user ID, a job ID, and a function ID. The function ID identifies the function that should be performed for an interrupted job. For example, the function ID "F01" represents "SCAN", and the function ID "F02" represents "PRINT." Thus, the job identifying table 12a in FIG. 6A lists the reading of the image of an original and the subsequent printing of the image for the job "J0001". FIG. 6A shows only four areas for function IDs by way of example, but more than four function IDs may be stored in the execution status table 12b.

FIG. 6B illustrates the execution status table 12b that lists interrupt information on a job when the job is interrupted. The interrupt information includes the number of pages in an interrupted job that has been read or printed, and the status of the job as to whether the job is still in progress or has been completed. The execution status table 12b stores the current status of the function of the interrupted job.

The execution status table 12b includes a function ID area that stores a function ID, a function name area that stores a string of characters representative of the name of the function, a page area that stores the number of pages that have been completed when the job is interrupted, and a status area that stores the status of the job when the job is interrupted. When a job to be scanned is interrupted, if the scanner 3 has not initiated scanning of an original, "IN QUEUE" is stored in the status area; if the scanner 3 has initiated the scanning of an original and the original remains on the automatic document feeder 300 or on the copy glass 301, "IN PROGRESS" is stored; and if no original exists on the automatic document feeder 300 or on the copy glass 301, "COMPLETED" is stored.

The authentication section 52 includes a user management data table 13 shown in FIG. 7 stored on a storage medium such as a hard disk. The authentication section 52 authenticates the authentication information, inputted by a user through the operation panel 50, against user IDs and corresponding passwords previously stored in the user management data table 13.

The user management data table 13 includes a user ID area that stores a user ID, a password area that stores the password of the user, a user name area that stores the name of the user, an email area that stores the email address of the user, and a FAX number area that stores the FAX number of the user.

In response to a command from the system controller 51, the job execution section 53 executes the job inputted by the user through the operation panel 50. For example, when the job execution section 53 receives a command to execute a copy job, the job execution section 53 interrupts the job currently in progress at a proper timing, for example, when the printing reaches the end of a page of the print medium. The communication controller 56 communicates data with an external device. The communication controller 56 receives print information from a host apparatus, transmits image information read by the scanning controller 54, and attaches the image information to an email before transmitting the email to a mail server.

{Overall Operation}

The overall operation of the image processing apparatus 1 of the aforementioned configuration will be described in more detail.

Figure 8:
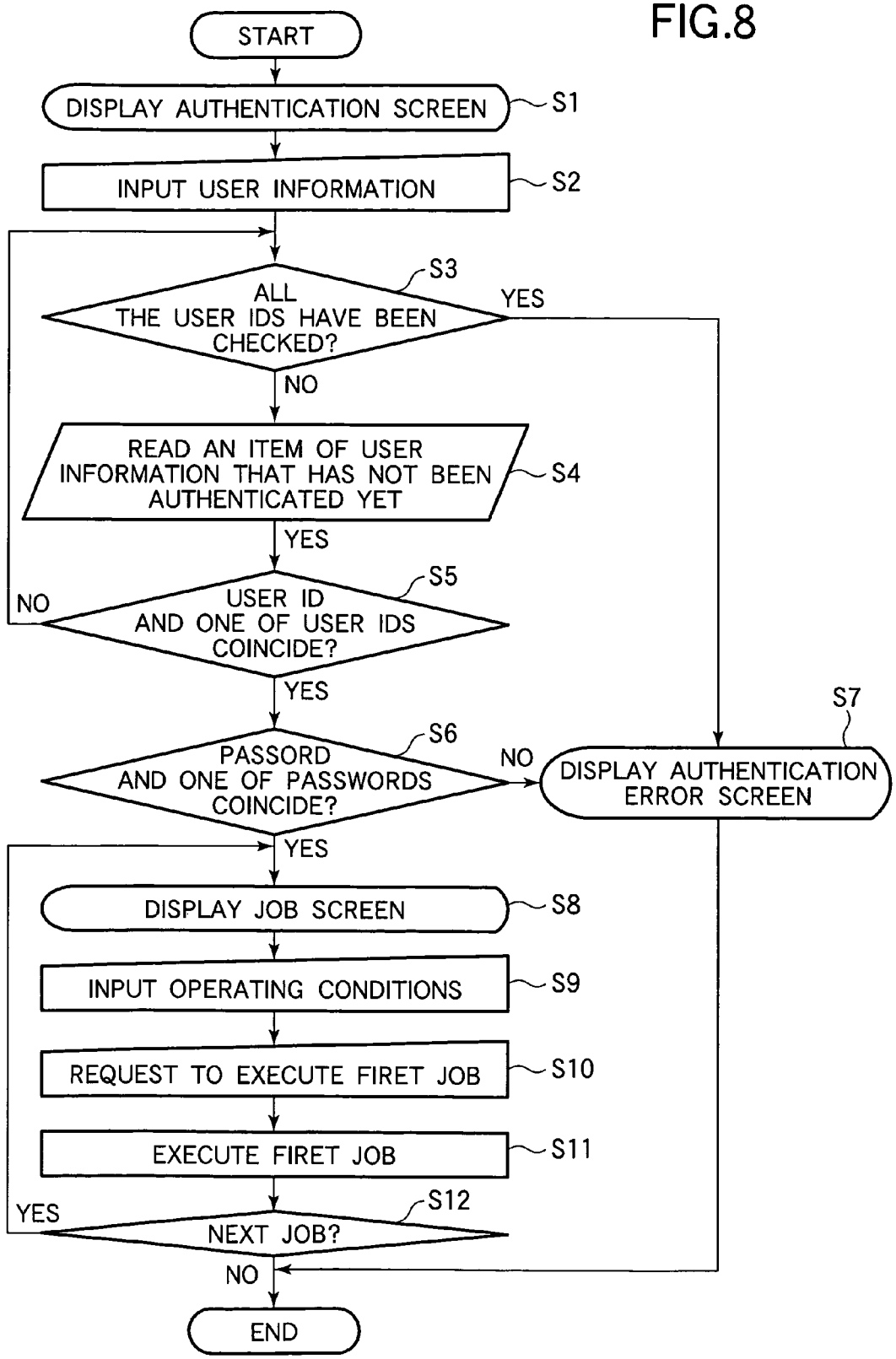
FIG. 8 is a flowchart illustrating the authentication of a user and the execution of a job.

FIG. 8 is a flowchart illustrating the authentication of a user and the execution of a job by the image processing apparatus 1. Specifically, the image processing apparatus 1 authenticates a first user (USER 1) against the user management data table 13, and then executes the first job for copying an original of a total of 20 pages.

Step S1: The display unit 50c of the operation panel 50 displays the authentication screen 21 (FIG. 4).

Step S2: The first user (USER 1) inputs his user information through the operation panel 50. More specifically, the first user inputs "U0001" into the user ID box 21a and "P0001" into the password box 21b, and then presses the "OK" button 21c. When the OK button 21c is pressed, the operation panel 50 transmits the "U0001" and "P0001" to the system controller 51 for authentication of the first user (USER 1)

Step S3: A check is made to determine whether the authentication of the inputted user ID "U0001" has been completed, i.e., the inputted user ID "U0001" has been compared against all of the user IDs stored in the user management data table 13. If the answer is YES, then the program jumps to step S7.

Step S4: The user management data table 13 holds a plurality of items of user information (i.e., user IDs and the corresponding passwords) previously stored therein. The authentication section 52 reads an item of user information that has not been authenticated yet from the user management data table 13.

Step S5: The system controller 51 compares the "U0001" with one of the user IDs to determine whether the "U0001" and the one of the user IDs coincide. If the answer is NO, then the program loops back to step S3 to repeat steps S3-S5 until the "U0001" has been compared against all of the user IDs stored in the user management data table 13.

Step S6: If the user ID "U0001" and the one of the user IDs stored in the user management data table 13 coincide (YES at S5), then the authentication section 52 compares the inputted password "P0001" with one of the passwords stored in the user management data table 13. If the password "P0001" and the one of the passwords stored in the user management data table 13 coincide (YES at S6), the authentication section 52 informs the system controller 51 of the success of authentication.

Step S7: If the authentication of the inputted user ID "U0001" against all of the user IDs stored in the user management data table 13 has been completed (YES at S3) or if the inputted password and any one of the plurality of passwords do not coincide (NO at S6), the authentication section 52 informs the system controller 51 of the failure of the authentication, and the system controller 51 causes the operation panel 50 to display to the user that authentication failed. Then, the program ends.

Step S8: Upon receiving notification from the system controller 51 that the authentication was successful, the operation panel 50 displays a job screen (not shown) to the first user, prompting the first user to input options (e.g., resolution and duplex printing) for a copy job.

Step S9: The first user inputs operating conditions for the first job through the job screen.

Step S10: When the first user selects execution of the first job after inputting the operating conditions, the operation panel 50 requests the system controller 51 to drive the job execution section 53 to execute the first job under the inputted operating conditions.

Step S11: The job execution section 53 controls the scanning controller 54 and the printing controller 55 under the inputted operating conditions. In other words, the scanning controller 54 reads an image of the original and the printing controller 55 prints the image of the original read by the scanning controller 54.

Step S12: If another job is in the print queue after completion of the first job, the program jumps back to step S8 where the next job is executed. If there is no job on the print queue (NO at S12), the program ends.

Figure 9:
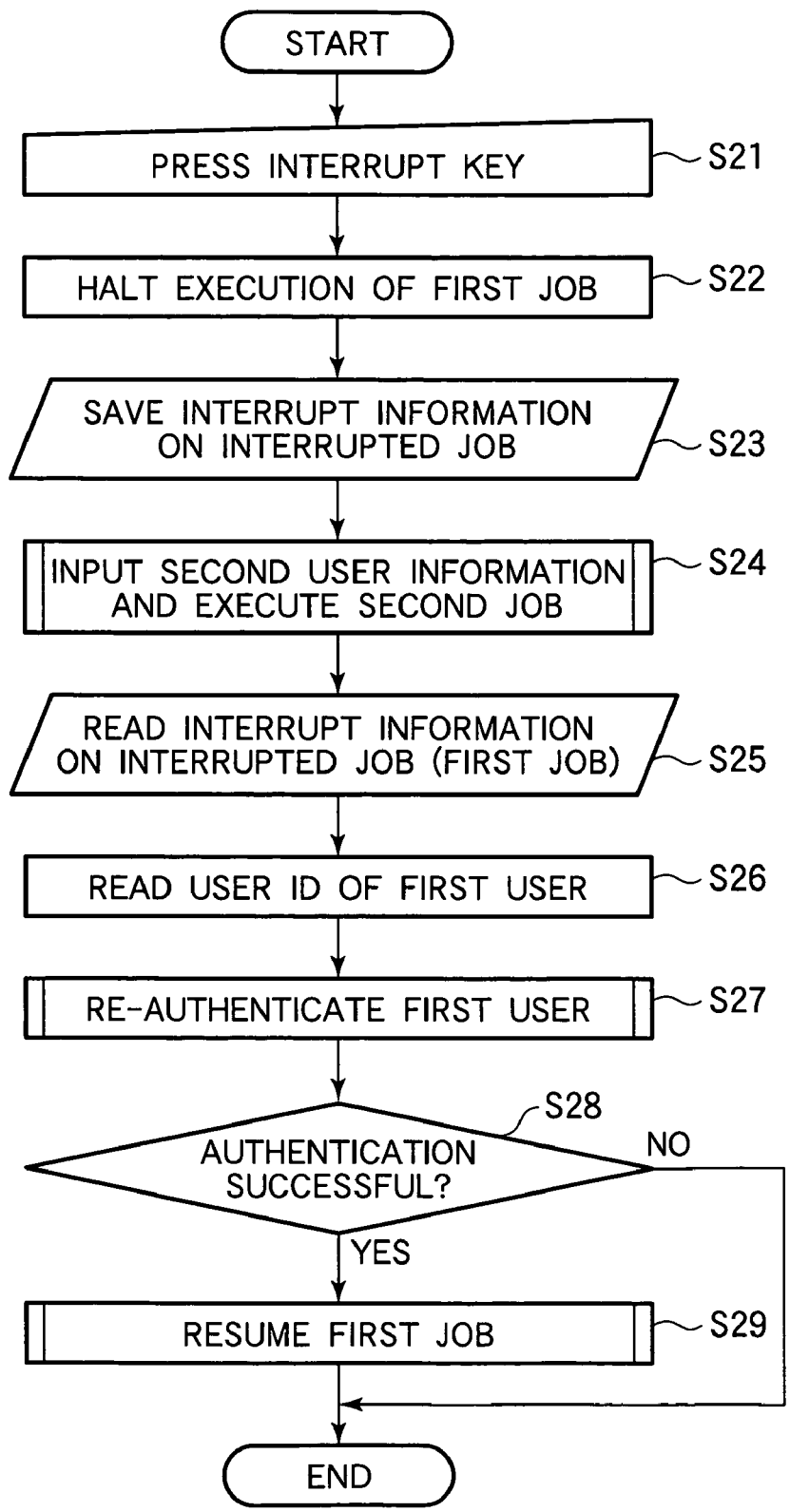
FIG. 9 is a flowchart illustrating an interrupt in which a second user interrupts the first job to execute a second job and then the first job is resumed after completion of the second job.

FIG. 9 is a flowchart illustrating an interrupt in which a second user (USER 2) interrupts the first job to execute a second job and then the first job is resumed after completion of the second job. The flowchart illustrates the interrupt assuming that the content of the interrupted job management table 12 is that shown in FIGS. 6A and 6B.

Step S21: Assume that the second user presses an interrupt key 50b on the operation panel 50 upon completion of printing of the first 15$^{th}$ page after the image of all of a total of 20 pages of the original have been read in. The operation panel 50 notifies the system controller 51 of the interrupt.

Step S22: In response to the notification of interrupt from the operation panel 50, the system controller 51 requests the job execution section 53 to halt the first job currently in progress, and the job execution section 53 controls the reading controller 54 and the printing controller 55 to halt the first job.

In response to the request from the system controller 51, the first job is interrupted as follows: Because the reading controller 54 has completed the reading of the images of the original, i.e., all of a total of 20 pages, the reading controller 54 sends no command to the scanner 3. Instead, the reading controller 54 notifies the job execution section 53 of "20" as the number of completed pages and "COMPLETED" as the current status of the first job. Because the printing of the 15$^{th}$ page of the image information read by the scanner 3 is in progress, the printing controller 55 controls the printer 2 to halt the printing at the end of the 15$^{th}$ page. Then, the printing controller 55 saves the image information for the 16$^{th}$ to 20$^{th}$ pages of the original into a memory device (not shown), and then notifies the job execution section 53 of the interrupt information, i.e., "15" in the page area and "IN PROGRESS" in the status area. The job execution section 53 transmits the interrupt information, received from the reading controller 54 and the printing controller 55, to the system controller 51.

Step S23: The system controller 51 saves the received interrupt information on the first job into corresponding tables: the job identifying table 12a and the execution status table 12b of the interrupted job management table 12.

Step S24: The second user (USER 2) commands to execute the second job just as the first user did for the first job. The second user (USER 2) inputs his user information through the operation panel 50. More specifically, the second user inputs "U0002" into the user ID box 21a and "P0002" into the password box 21b, and then presses the "OK" button 21c. The detailed description of the second job is omitted here. The second job may be a copy job, a FAX transmission job, a scan-to-email job, or any other type of job. The scan-to-email job is such that an image file containing an image read from an original is transmitted by email. For example, a FAX transmission job and a scan-to-email job may be executed concurrently, in which case the operation panel 50 displays to the user the authentication screen 21 immediately after the second user commands to execute the second job.

Step S25: Upon completion of the execution of the second job, the system controller 51 reads the interrupt information on the first job (i.e., first user, the functions for the first job, and the status of execution of the functions) from the interrupted job management table 12.

Step S26: Then, the system controller 51 reads the user ID "U0001" of the first user from the user ID area of the job identifying table 12a.

Step S27: Then, the system controller 51 executes the re-authentication of the first user again. The re-authentication at step S27 will be described later in more detail.

Step S28: The system controller 51 makes a decision to determine whether re-authentication is successful, i.e., whether the current user is an authorized user.

Step S29: If the re-authentication at S27 is successful, i.e., the first job is indeed a job for the first user (YES at S28), the system controller 51 performs a job resuming process in which the interrupted job is resumed (step S29). If the re-authentication at S27 fails (NO at S28), then the system controller 51 will not perform the job resuming process, and the program ends. The job resuming process at S29 will be described later in more detail.

FIG. 7 illustrates a user management table 13. FIG. 10 is a flowchart illustrating re-authentication. FIG. 11 illustrates an authentication screen when the re-authentication is performed. The re-authentication at S27 shown in FIG. 9 will be described with reference to FIG. 10.

Step S31: The system controller 51 outputs the user ID "U0001", which was read from the user ID area of the job identifying table 12a, to the operation panel 50.

Step S32: The operation panel 50 displays to the user the authentication screen 21 as shown in FIG. 11 in which the user ID "U0001" appears in the ID box 21a, thereby prompting the first user to input his password.

Step S33: The first user inputs his password into the password box 21b of the authentication screen 21 and then presses the OK button 21c. Then, the operation panel 50 reads the inputted password from the password box 21b and then sends the inputted password to the system controller 51.

Step S34: Then, the system controller 51 controls the authentication section 52 to authenticate the user ID "U0001" against the inputted password. The authentication section 52 reads the password for the user ID "U0001" from the user management data table 13.

Step S35: The authentication section 52 then compares the password for the user ID "U0001" with the inputted password.

If the password read from the user management data table 13 and the inputted password coincide (YES at S35), it is determined that the re-authentication is successful, and the program ends.

Step S36: If the password read from the user management data table 13 and the inputted password do not coincide (NO at S35), the authentication section 53 notifies the operation panel 50 via the system controller 51 that the re-authentication failed, in which case the operation panel 50 displays the authentication error screen 22 (FIG. 5) to the user and the program ends.

Upon completion of the flowchart shown in FIG. 10, the program returns to the flowchart shown in FIG. 9 and steps S28 onward will be executed.

Figure 12:
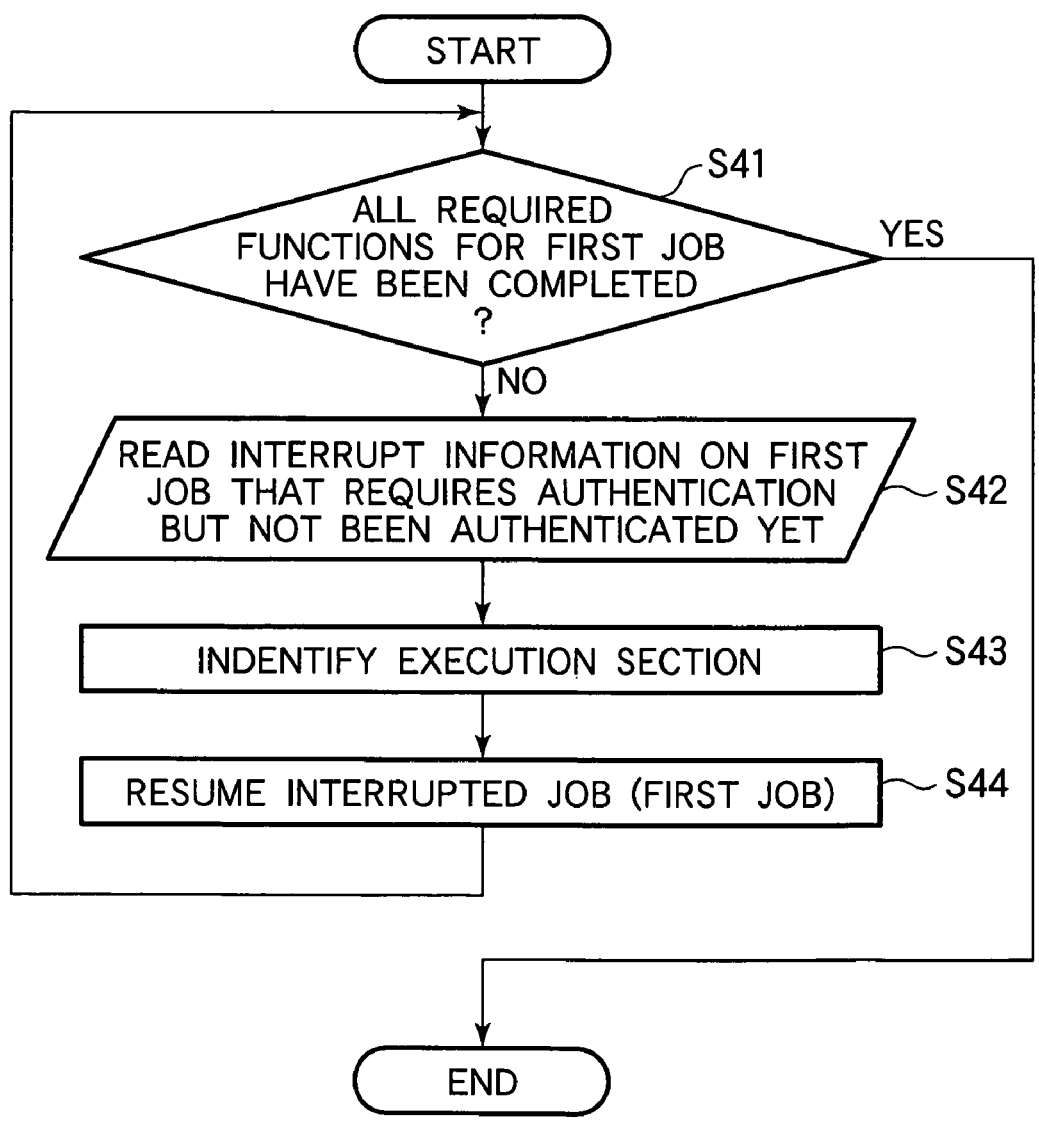
FIG. 12 illustrates the details of an operation at step S29 shown in FIG. 9.

FIG. 12 illustrates the details of the operation at S29 shown in FIG. 9 where the interrupted job (i.e., first job) is resumed. The operation will be described with reference to FIG. 12.

Step S42: The system controller 51 reads the interrupt information on the first job from the interrupted job management table 12, and outputs the interrupt information on the first job to the job execution section 53. The job execution section 53 reads the execution function information from the execution status table 12b.

Step S43: The job execution section 53 identifies an execution section corresponding to the interrupted job based on the function ID and function name in the execution status table 12b. For example, if the function ID is "F01" in the execution status table 12b, then function name is "SCAN" and therefore the execution section for the interrupted job is the reading controller 54. If the function ID is "F02" in the execution status table 12b, then the function name is "PRINT" and therefore the execution section for the interrupted job is the printing controller 55.

Step S44: After having identified the execution section corresponding to the interrupted job, the job execution section 53 notifies the reading controller 54 and printing controller 55 of the interrupt information: the number of pages (i.e., "20") that have been read when the interrupt occurs and the status of the first job (i.e., "COMPLETED") when the interrupt occurs. The job execution section 53 then requests the reading controller 54 and printing controller 55 of the re-execution of the interrupted job (first job). Because the reading controller 54 has already completed the reading of the image of the original, the reading controller 54 performs nothing. Because the number of completed pages is "15" and therefore the interrupt information is "IN PROGRESS", the printing controller 55 reads image information on the 16$^{th}$ to 20$^{th}$ page that had been saved on the memory device (not shown) and then resumes the printing of the interrupted job (first job).

Step S41: When the printing of the remaining portion of the interrupted job (first job) has been completed, the printing controller 55 determines whether all of the required functions for the first job have been completed. If there is no function to be performed for the first job (YES at S41), the program ends.

The above-described example assumes that the second job for the second user interrupts the first job for the first user. Instead, both the first and second jobs may be for the first user. A plurality of interrupts may occur in such a way that one interrupt job may be interrupted by another interrupt job, in which case the user for the job to be resumed is authenticated immediately before that interrupted job is resumed. Furthermore, the second user may have a plurality of jobs to interrupt a job currently in progress.

In the aforementioned example, the first job is resumed after the execution of the second job has been completed, and the second job is executed just as in the first job according to the flowchart shown in FIG. 8. Alternatively, the image processing apparatus may be modified such that the second user may cancel the second job in the middle of the execution of the second job, in which case the cancellation of the second job is considered to be the completion of the second job.

As described above, when the second job for the second user interrupts the first job for the first user, the second user is authenticated. Before the execution of the interrupted first job is resumed after the second job has been completed, the first user is re-authenticated so that the execution of the interrupted job can be resumed only when the current user and the user for the first job coincide. This provides security for the first job, preventing an unauthorized user from picking up the print. Prior to the re-authentication of the first user, the user ID of the authorized user for the first job to be resumed is displayed on the authentication screen (FIG. 11). Because the user ID has been inputted when the first job is initiated, the first user is required to input only his password for re-authentication. This saves the time and effort required for the first user to input all items of authentication information all over again.

Second Embodiment

Figures 13, 14:
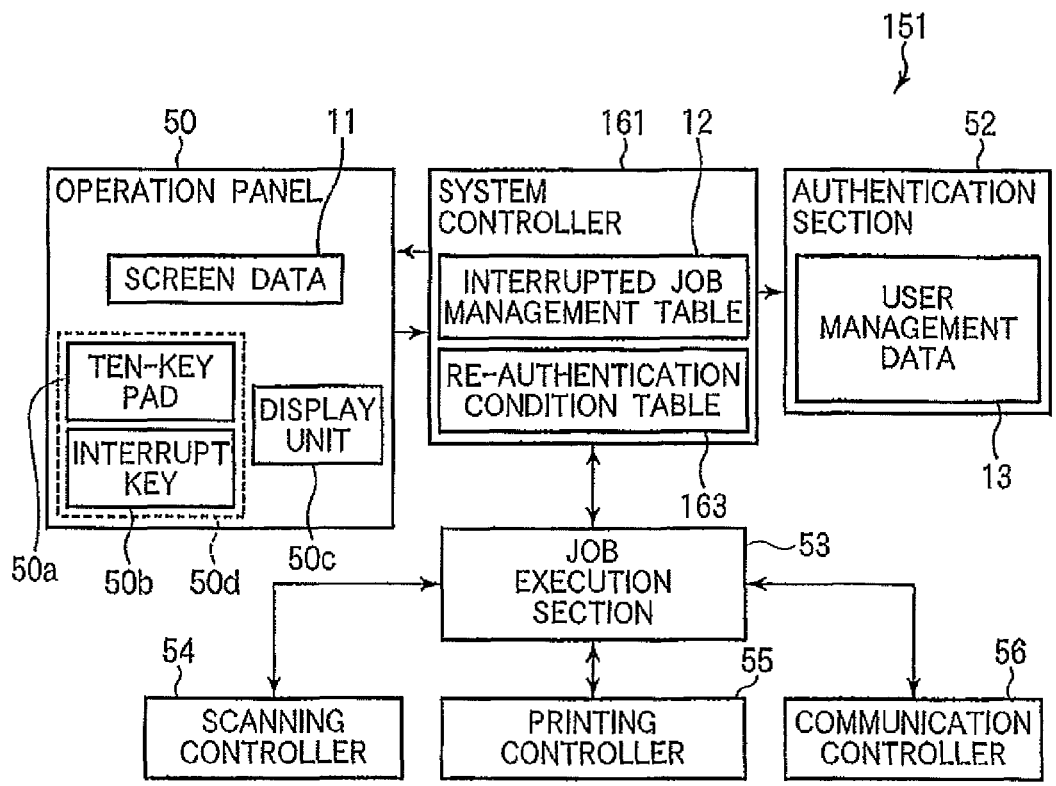
FIG. 13 is a block diagram illustrating the configuration of a controlling system of a second embodiment.
FIG. 14 illustrates an example of a re-authentication table.

FIG. 13 is a block diagram illustrating the configuration of the controlling system that controls pertinent portions of an image processing apparatus 151 of a second embodiment.

The control system of the image processing apparatus 151 differs from that of the image processing apparatus 1 in that a system controller 161 includes a re-authentication condition table 163, and that the operation of the system controller 161 differs from that of the system controller 51 accordingly. Elements of the system controller 161 common to those of the system controller 51 have been given the same reference numerals and their description is omitted. Thus, a description will be given only of portions different from those of the system controller 51.

FIG. 14 illustrates an example of the re-authentication table 163. The re-authentication table 163 is a table stored in a storage medium such as a hard disk, and lists function IDs, e.g., F01 and F02 and corresponding statuses of execution. Each status of execution includes information on whether re-authentication is required or not. The symbol "YES" denotes that authentication is required before the job is resumed, and the symbol "NO" denotes that authentication is not required before the job is resumed.

For the function "F01 (SCAN)", if an interrupt occurs when the reading of the original has not been initiated or the reading of the original is being performed, the authentication table 163 holds "YES" for the statuses "IN QUEUE" and "IN PROGRESS."

If an interrupt occurs after the reading has been completed, the authentication table 163 holds "NO" for the status "COMPLETED".

For the function "F02 (PRINT)", if an interrupt occurs when the reading of the original has not been initiated, the reading of the original is being performed, or the reading has been completed, the authentication table 163 holds "NO" for the statuses "IN QUEUE," "IN PROGRESS," and "COMPLETED."

Figure 15:
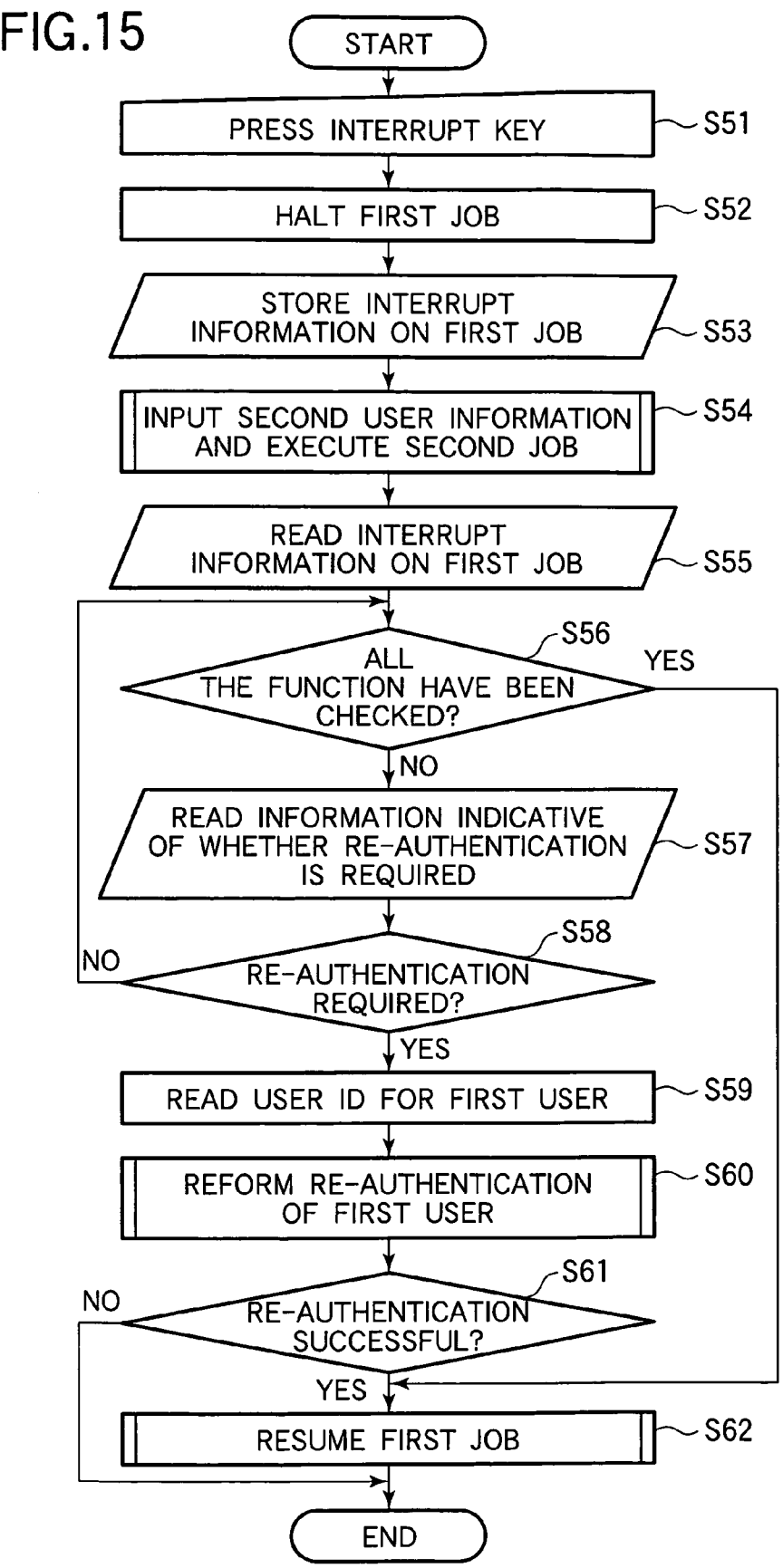
FIG. 15 is a flowchart illustrating the operation of the second embodiment.

A description will be given of an operation in which a second job interrupts a first job and the first job is resumed after the second job has been completed. The description assumes that an interrupt occurs when the re-authentication condition table 163 holds the information shown in FIG. 14, and that the interrupted job management table 12 holds the information shown in FIGS. 6A and 6B. The operation will be described with reference to the flowchart shown in FIG. 15.

The authentication of a first user (USER 1) and the execution of the first job are the same as those shown in FIG. 8. Therefore, the detailed description is omitted.

Assume that the first job is a copy job of a total of 20 pages, and that the printing of the first job is in progress.

Step S51: A second user (USER 2) presses an interrupt key 50b on the operation panel 50 (FIG. 13). The operation panel 50 informs the system controller 161 of the occurrence of an interrupt. The system controller 161 controls the job execution section 53 to halt the first job currently in progress. The job execution section 53 commands the reading controller 54 and printing controller 55 to halt the execution of the first job.

Step S52: In response to the command from the job execution section 53, the first job is interrupted as follows: Because the reading of all of a total of 20 pages of the original has been completed, the reading controller 54 does not send any command to the scanner 3 but notifies the job execution section 53 of "20" and "COMPLETED". Because the printing of the 15$^{th}$ page is in progress, the printing controller 55 controls the printer 2 to halt printing upon completion of the 15$^{th}$ page, and saves the image information of 16-20$^{th}$ pages into a memory device (not shown). Then, the printing controller 55 notifies the job execution section 53 of the interrupt information on the first job: "15" and "IN PROGRESS." Then, the job execution section 53 reads the interrupt information from the reading controller 54 and the printing controller 55, and then sends the interrupt information to the system controller 161.

Step S53: The system controller 161 stores the received interrupt information of the first job into the job identifying table 12a (FIG. 6A), and the execution status table 12b.

Step S54: The second user commands the execution of the second job just as the first user did for the first job according to the flowchart shown in FIG. 8. The second user (USER 2) inputs his user information through the operation panel 50. More specifically, the second user inputs "U0002" into the user ID box 21a and "P0002" into the password box 21b, and then presses the "OK" button 21c. The detailed description of the execution of the second job is omitted here. The second job may be a copy job, a FAX transmission job, a scan-to-email job, or any other type of job. The scan-to-email job is such that an image file containing an image read from an original is transmitted by email.

Step S55: Upon completion of the execution of the second job, the system controller 161 reads the interrupt information on the first job from the execution status table 12b (FIG. 6B) i.e., the function for the first job, the number of pages completed, and the status of execution of the function.

Step S56: The system controller 161 then makes a decision as to whether all the functions have been checked. If the answer is YES at step S56, then the program jumps to step S62 where the system controller 161 does not perform re-authentication and but resumes the first job.

Step S57: The system controller 161 reads the information indicative of whether re-execution is required, from the re-authentication condition table 163.

Step S58: The system controller 161 then makes a decision as to whether the re-authentication of the first job is required.

Step S59: When at least one of the functions stored in the execution status table 12b needs to be re-authenticated (YES at S58), the system controller 161 reads the user ID "U0001" for the first user from the user ID area of the job identifying table 12a.

Step S60: Then, the system controller 161 controls the authentication section 52 to execute the re-authentication for the first user. The re-execution at step S60 is the same as that of the first embodiment described with reference to FIG. 10, and the description is therefore omitted.

Step S61: A check is made to determine whether the required re-authentication of the first user is successful. If the re-authentication fails, the program ends. If the re-authentication is successful, the program proceeds to step S62.

The execution status table 12b shows that the function "F01" represents the reading of a total of 20 pages of the image of the original, and the re-authentication condition table 163 shows that the function "F01" has been "COMPLETED." Thus, re-authentication is not required, i.e., the re-authentication condition table 163 shows "NO."

The function "F02" represents the printing of the image of the original. The printing has been completed up to the 15$^{th}$ page and the remaining 16-20$^{th}$ pages are to be printed. Thus, re-authentication is not required, i.e., the re-authentication condition table 163 shows "NO."

Since none of the functions F01 and F02 needs to be re-authenticated, the program jumps back to step S62.

Step S62: If the re-authentication has completed for all the functions stored in the execution status table 12b that require re-authentication (YES at S56) or re-authentication of the first user is successful at S61, then the first job is resumed. The operation at step S62 is the same as that of the first job shown in FIG. 12, and therefore the description is omitted.

As described above, immediately before the interrupted first job is resumed, a decision is made based on the interrupt information to determine whether re-authentication for the first user is required. If the first job is interrupted at an execution status of the first job in which re-authentication of the user for the first job is required prior to re-start of the first job, then re-authentication of the first user ensures that the first job is accessed only by the authorized first user. This provides security for the first job, eliminating the possibility of an unauthorized user impersonating the legitimate user. Thus, the authentication effectively prevents an unauthorized user from replacing the legitimate user's original with the unauthorized user's original to fraudulently obtain a copy of the unauthorized user's original, thereby preventing the legitimate user from being improperly billed for the fraudulently obtained copy.

If the first job is interrupted under an execution status that re-authentication of the user for the first job is not required prior to re-start of the first job, the first job is resumed without re-authentication of the first user. This eliminates the time and effort required for the first user to input all items of authentication information all over again, expediting the execution of the interrupted first job.

The first and second embodiments have been described with respect to an image processing apparatus capable of operating as a digital multi-function apparatus. The invention is not limited to these embodiments but may be applied to various apparatuses including a printer, a facsimile machine, a copying machine, and a print server.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image processing apparatus, comprising:
   an input section through which a first user inputs first user information and through which a second user inputs second user information;
   an authentication section that performs authentication of the first user based on the first user information and authentication of the second user based on the second user information;
   a job execution section that executes a first job and a second job; and
   a controller that
      controls the authentication section to perform first authentication of the first user information, and controls the job execution section to execute the first job if the first authentication is successful, and
      controls the job execution section to halt the execution of the first job upon receiving an interrupt inputted through the input section by the second user, and subsequently controls the job execution section to execute the second job when the first job remains interrupted;
   wherein the controller includes a memory that stores interrupt information indicative of a status of the execution of the first job when the interrupt occurs; and
   wherein the controller controls the authentication section to perform second authentication of the first user information after the second job has been initiated but before the second job has been completed, and controls the job execution section to resume the execution of the first job authentication is successful, so that the first job and the second job are concurrently executed.

2. The image processing apparatus according to claim 1, wherein the first user information includes a user ID and a password for the first user, and the authentication section performs the first authentication based on the user ID and the password for the first user;
   wherein when the authentication section performs the second authentication, the authentication section displays the user ID on a display prompting the first user to input the password, and then performs the second authentication based only on the password inputted in response to the prompt.

3. The image processing apparatus according to claim 1, wherein the controller determines based on the interrupt information whether the second authentication should be performed.

4. The image processing apparatus according to claim 3, wherein the interrupt information includes a type of the first job and the status of the execution of the first job.

5. The image processing apparatus according to claim 1, wherein the second user inputs the second user information through the input section,
wherein the controller controls the authentication section to perform the authentication of the second user based on the second user information, and then controls the execution section to execute the second job if the authentication of the second user is successful.

6. The image processing apparatus according to claim 1, further comprising a display unit, the controller controlling the display unit to display the first user information before the second authentication is performed.

7. The image processing apparatus according to claim 1, wherein the controller determines whether the second authentication should be performed, based on the status of the execution of the first job.

8. A method of processing information comprising:
executing first authentication of a first user based on first user information against a previously stored first user;
executing a first job if the first authentication is successful;
accepting an interrupt when the first job is being executed;
halting the execution of the first job in response to the interrupt and then storing interrupt information indicative of a status of the execution of the first job;
executing a second job from a second user when the first job remains interrupted;
executing second authentication of the first user after the second job has been initiated but before the second job has been completed, the second authentication being performed based on the first user information; and the execution of the first job if the second authentication is successful,
wherein the first job and the second job are concurrently executed.

9. The method according to claim 8, wherein the first authentication includes comparing the first user information against a user ID and a password that have been previously stored in the authentication section,
wherein the second authentication includes displaying a user ID on a display prompting the first user to input the password and then comparing the password inputted in response to the prompt only against the password that have been previously stored in the authentication section.

10. The method according to claim 8, further comprising determining based on the interrupt information whether the second authentication should be performed.

11. The method according to claim 10, wherein the interrupt information further comprising a type of the first job, the method further comprising determining based on the type of the first job and the status of the execution of the first job whether the second authentication should be performed.

12. The method according to claim 8, further comprising executing the second job after the authentication of the second user is successful.

* * * * *